US012496819B2

(12) United States Patent
Nakase et al.

(10) Patent No.: US 12,496,819 B2
(45) Date of Patent: Dec. 16, 2025

(54) LIQUID EJECTION APPARATUS

(71) Applicant: BROTHER KOGYO KABUSHIKI KAISHA, Nagoya (JP)

(72) Inventors: Takafumi Nakase, Nagoya (JP); Masayoshi Hayashi, Nagoya (JP); Nobumasa Tanaka, Nagoya (JP); Zenichiro Sasaki, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 23 days.

(21) Appl. No.: 17/728,059

(22) Filed: Apr. 25, 2022

(65) Prior Publication Data

US 2022/0339929 A1 Oct. 27, 2022

(30) Foreign Application Priority Data

Apr. 27, 2021 (JP) ................................ 2021-074994

(51) Int. Cl.
*B41J 2/045* (2006.01)

(52) U.S. Cl.
CPC ........... *B41J 2/0451* (2013.01); *B41J 2/0458* (2013.01)

(58) Field of Classification Search
None
See application file for complete search history.

(56) References Cited

U.S. PATENT DOCUMENTS

| | | | | |
|---|---|---|---|---|
| 8,356,876 | B2 * | 1/2013 | Yoshida | B41J 2/165 347/30 |
| 2001/0038396 | A1 | 11/2001 | Imanaka et al. | |
| 2007/0139461 | A1 | 6/2007 | Izuo | |
| 2011/0193903 | A1 | 8/2011 | Kim et al. | |
| 2012/0286864 | A1 * | 11/2012 | Vella-Coleiro | H04L 27/368 330/149 |
| 2013/0278656 | A1 * | 10/2013 | Govyadinov | B41J 2/0451 347/9 |

(Continued)

FOREIGN PATENT DOCUMENTS

| | | | |
|---|---|---|---|
| JP | H10786 | A | 1/1998 |
| JP | 2001315356 | A | 11/2001 |

(Continued)

*Primary Examiner* — Alejandro Valencia
(74) *Attorney, Agent, or Firm* — Scully, Scott, Murphy & Presser, P. C.

(57) ABSTRACT

A liquid ejection head has a nozzle. A controller is configured to: control the liquid ejection head to perform inspection driving, the inspection driving being driving the liquid ejection head to eject liquid from the nozzle for determining whether the nozzle is an abnormal nozzle having an abnormality in ejection of liquid; acquire a determination signal outputted from the signal output device, the determination signal indicating whether the nozzle is the abnormal nozzle; acquire a non-driving signal outputted from the signal output device when the inspection driving is not performed by the liquid ejection head; generate a differential signal by superposing the determination signal and the non-driving signal, the differential signal being a signal indicating a difference between a value of the determination signal and a value of the non-driving signal at each timing; and determine whether the nozzle is the abnormal nozzle based on the differential signal.

19 Claims, 13 Drawing Sheets

(56) References Cited

U.S. PATENT DOCUMENTS

| | | | | |
|---|---|---|---|---|
| 2014/0300657 | A1 | 10/2014 | Ike | |
| 2016/0206804 | A1* | 7/2016 | Holmer | A61B 5/7217 |
| 2016/0207340 | A1 | 7/2016 | Takano et al. | |
| 2019/0012504 | A1* | 1/2019 | Kim | G06V 40/1306 |
| 2021/0193102 | A1* | 6/2021 | Chiang | G10K 11/1785 |

FOREIGN PATENT DOCUMENTS

| | | | |
|---|---|---|---|
| JP | 2007152889 | A | 6/2007 |
| JP | 2011248475 | A | 12/2011 |
| JP | 2012210768 | A | 11/2012 |
| JP | 2014200982 | A | 10/2014 |
| JP | 2016135585 | A | 7/2016 |
| JP | 2016178754 | A | 10/2016 |
| JP | 2020082510 | A | 6/2020 |

* cited by examiner

LIQUID EJECTION APPARATUS

CROSS REFERENCE TO RELATED APPLICATIONS

This application claims priority from Japanese Patent Application No. 2021-074994 filed Apr. 27, 2021. The entire content of the priority application is incorporated herein by reference.

BACKGROUND

As an example of a liquid ejection apparatus that ejects liquid from a nozzle, a printer that ejects ink from a nozzle and performs recording is known.

SUMMARY

A printer performs an ejection inspection to check whether ink is ejected satisfactorily. In the ejection inspection, it is determined whether ink is ejected satisfactorily based on whether an amplitude (the difference between a maximum potential and a minimum potential) of a detection signal detected when a drive signal is applied to a piezo element of a head exceeds a threshold value.

Further, the printer performs a noise inspection for determining the presence or absence of noise. When it is determined by the noise inspection that there is no noise, it is determined whether ink is ejected satisfactorily based on the result of the ejection inspection.

As described above, a noise inspection is performed, and when it is determined that there is no noise, it is determined whether ink is ejected satisfactorily based on the result of the ejection inspection. However, in the above printer, it is sometimes difficult to actually perform the ejection inspection in a state where there is no noise, for example, since a certain amount of noise is always input from an AC power source.

In view of the foregoing, an example of an object of this disclosure is to provide a liquid ejection apparatus configured to suppress the influence of noise and accurately determine whether a nozzle is an abnormal nozzle.

According to one aspect, this specification discloses a liquid ejection apparatus. The liquid ejection apparatus includes a liquid ejection head, a signal output device, and a controller. The liquid ejection head has a nozzle configured to eject liquid. The controller is configured to: control the liquid ejection head to perform inspection driving, the inspection driving being driving the liquid ejection head to eject liquid from the nozzle for determining whether the nozzle is an abnormal nozzle having an abnormality in ejection of liquid; acquire a determination signal outputted from the signal output device, the determination signal indicating whether the nozzle is the abnormal nozzle; acquire a non-driving signal outputted from the signal output device when the inspection driving is not performed by the liquid ejection head; generate a differential signal by superposing the determination signal and the non-driving signal, the differential signal being a signal indicating a difference between a value of the determination signal and a value of the non-driving signal at each timing; and determine whether the nozzle is the abnormal nozzle based on the differential signal. According to another aspect, this specification also discloses a liquid ejection apparatus. The liquid ejection apparatus includes a controller. The controller is configured to: control a liquid ejection head to perform inspection driving, the inspection driving being driving a liquid ejection head to eject liquid from a nozzle of the liquid ejection head for determining whether the nozzle is an abnormal nozzle having an abnormality in ejection of liquid; acquire a determination signal indicating whether the nozzle is the abnormal nozzle; acquire a non-driving signal; generate a differential signal indicating a difference between a value of the determination signal and a value of the non-driving signal at each timing using the determination signal and the non-driving signal; and determine whether the nozzle is the abnormal nozzle based on the differential signal.

In this disclosure, a noise component is common to the determination signal and the non-driving signal. Thus, the differential signal which is the signal of the difference between the value of each determination signal and the value of the non-driving signal is a signal in which the noise component is reduced in the determination signal. This allows accurate determination of whether the nozzle is an abnormal nozzle based on the differential signal.

BRIEF DESCRIPTION OF THE DRAWINGS

Embodiments in accordance with this disclosure will be described in detail with reference to the following figures wherein.

DETAILED DESCRIPTION

Hereinafter, embodiments of this disclosure will be described.

<Overall Configuration of Printer>

Figure 1:
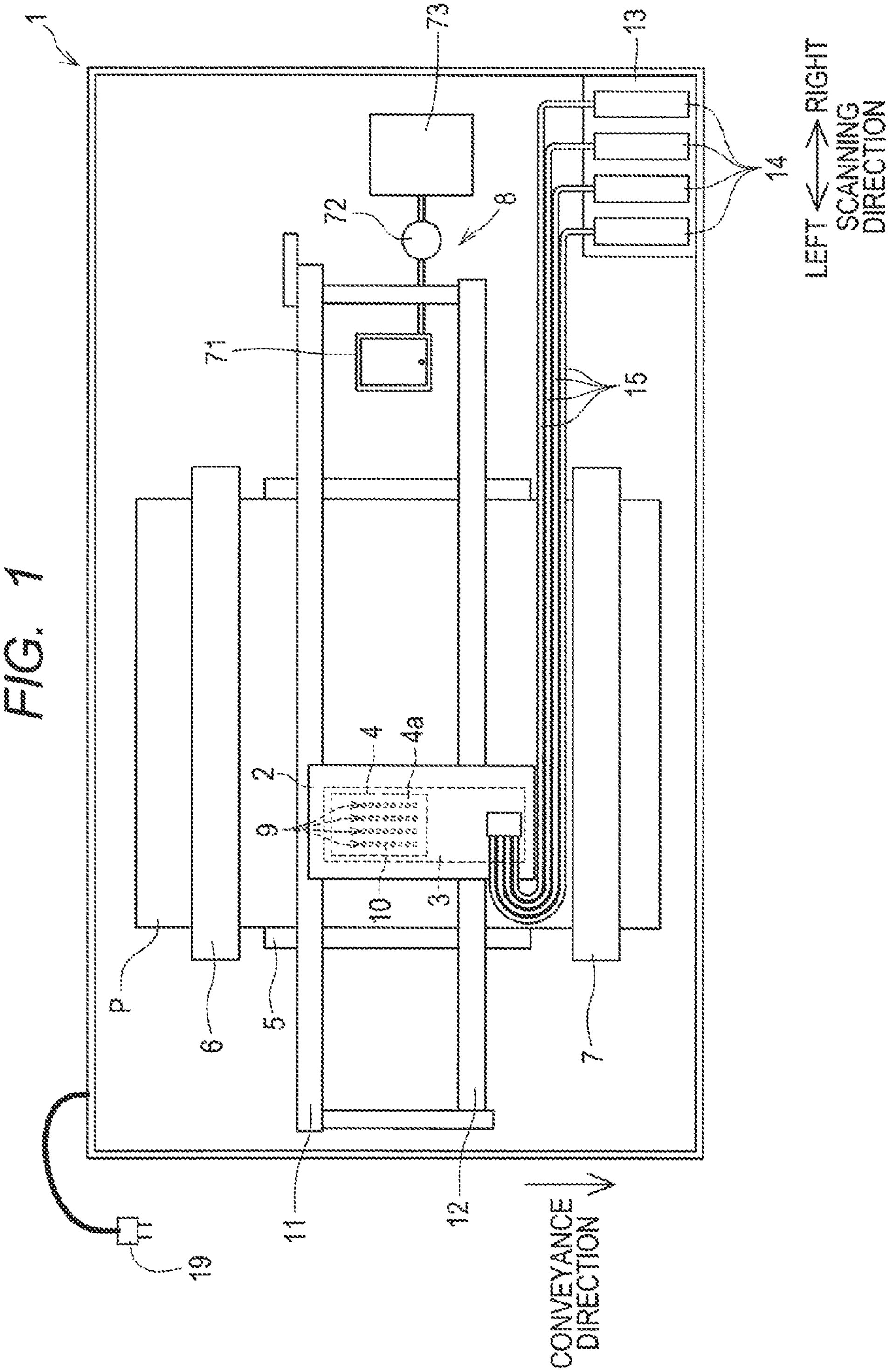
FIG. 1 is a schematic configuration diagram of a printer.

As shown in FIG. 1, a printer 1 according to a present embodiment ("liquid ejection apparatus") includes a carriage 2, a sub tank 3, an inkjet head 4 ("liquid ejection head"), a platen 5, conveyance rollers 6 and 7, a maintenance unit 8, a plug 19, and so on.

The carriage 2 is supported by two guide rails 11 and 12 extending in a scanning direction. The carriage 2 is connected to a carriage motor 86 (see FIG. 4) via a belt and so on (not shown). When the carriage motor 86 is driven, the carriage 2 moves in the scanning direction along the guide rails 11 and 12. In the following, the right side and the left side in the scanning direction are defined as shown in FIG. 1 for description.

The sub tank 3 is mounted on the carriage 2. Here, the printer 1 includes a cartridge holder 13, and four ink cartridges 14 are detachably attached to the cartridge holder 13. The four ink cartridges 14 are arranged in the scanning direction, and store ink ("liquid") of black, yellow, cyan, and magenta from the one arranged at the right side in the scanning direction. The sub tank 3 is connected to the four ink cartridges 14 mounted on the cartridge holder 13 via four tubes 15. With this configuration, the ink of the above four colors is supplied from the four ink cartridges 14 to the sub tank 3.

The inkjet head 4 is mounted on the carriage 2 and connected to the lower end of the sub tank 3. The inkjet head 4 is supplied with ink of the above four colors from the sub tank 3. The inkjet head 4 ejects ink from a plurality of nozzles 10 formed on a nozzle surface 4*a* which is the lower surface of the inkjet head 4. More specifically, the plurality of nozzles 10 are arranged in a conveyance direction perpendicular to the scanning direction to form nozzle arrays 9, and four nozzle arrays 9 are arranged in the scanning direction on the nozzle surface 4*a*. Ink of black, yellow, cyan, and magenta is ejected from the plurality of nozzles 10 from those forming the nozzle array 9 at the right side in the scanning direction.

The platen 5 is arranged below the inkjet head 4 and faces the plurality of nozzles 10. The platen 5 extends over the entire width of a recording sheet P in the scanning direction and supports the recording sheet P from below. The conveyance roller 6 is arranged upstream of the inkjet head 4 and the platen 5 in the conveyance direction. The conveyance roller 7 is arranged downstream of the inkjet head 4 and the platen 5 in the conveyance direction. The conveyance rollers 6 and 7 are connected to a conveyance motor 87 (see FIG. 4) via a gear (not shown) and so on. When the conveyance motor 87 is driven, the conveyance rollers 6 and 7 rotate, and the recording sheet P is conveyed in the conveyance direction.

The maintenance unit 8 includes a cap 71, a suction pump 72, and a waste liquid tank 73. The cap 71 is arranged at the right side of the platen 5 in the scanning direction. When the carriage 2 is located at a maintenance position at the right side of the platen 5 in the scanning direction, the plurality of nozzles 10 face the cap 71.

Figure 4:
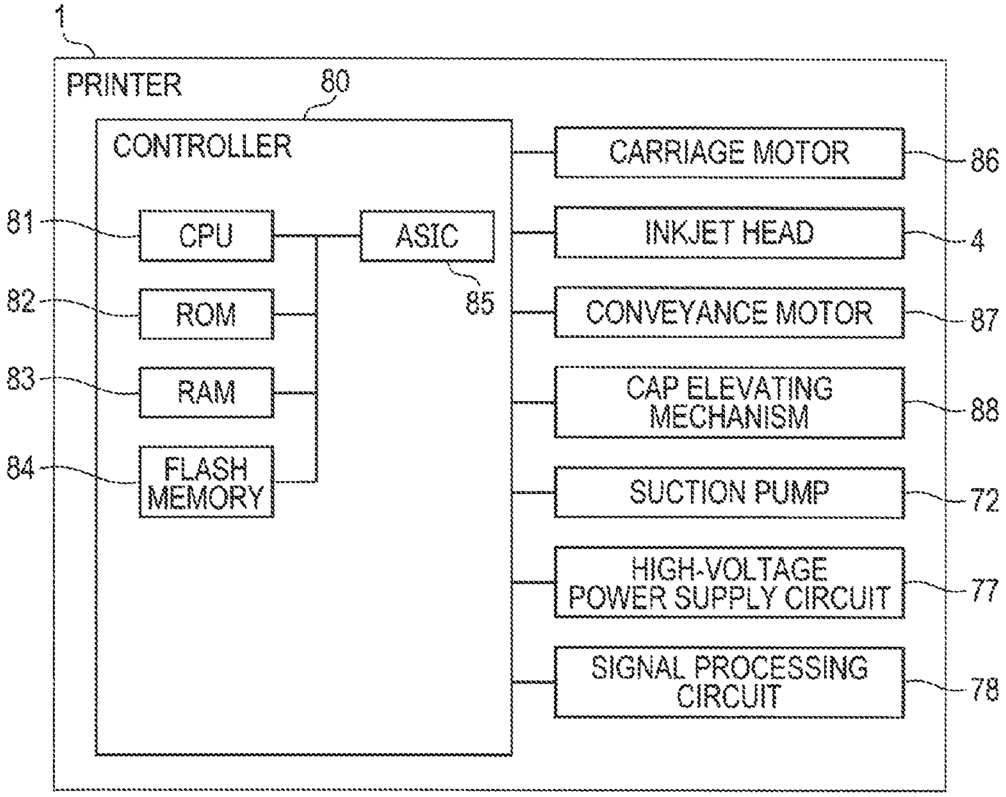
FIG. 4 is a block diagram showing an electrical configuration of the printer.

The cap 71 is configured to be raised and lowered by a cap elevating mechanism 88 (see FIG. 4). In response to the cap 71 being raised by the cap elevating mechanism 88 in a state where the plurality of nozzles 10 face the cap 71 by positioning the carriage 2 at the maintenance position, the upper end of the cap 71 contacts with the nozzle surface 4*a* and the plurality of nozzles 10 are covered with the cap 71. The cap 71 is not limited to a cap covering the plurality of nozzles 10 by contacting with the nozzle surface 4*a*. The cap 71 may be a cap that covers a plurality of nozzles 10 by, for example, contacting with a frame (not shown) arranged at the periphery of the nozzle surface 4*a* of the inkjet head 4.

The suction pump 72 is a tube pump and so on, and is connected to the cap 71 and the waste liquid tank 73. The maintenance unit 8 performs a so-called suction purge. In the suction purge, when the suction pump 72 is driven in a state where the plurality of nozzles 10 are covered by the cap 71, ink in the inkjet head 4 is discharged from the plurality of nozzles 10. The ink discharged by the suction purge is stored in the waste liquid tank 73.

According to the above description, the cap 71 covers all the nozzles 10, and the ink in the inkjet head 4 is discharged from all the nozzles 10 in the suction purge. Alternatively, the cap 71 may separately include a portion covering the plurality of nozzles 10 constituting the rightmost nozzle array 9 for ejecting black ink, and a portion covering the plurality of nozzles 10 constituting the left three nozzle arrays 9 for ejecting color ink (yellow, cyan, magenta ink), and may be configured to selectively discharge either black ink or color ink in the inkjet head 4 in the suction purge. Alternatively, in another modification, a cap may be provided individually for each nozzle array 9, so that ink is discharged individually from the nozzles 10 of each nozzle array 9 in the suction purge.

Figure 2:
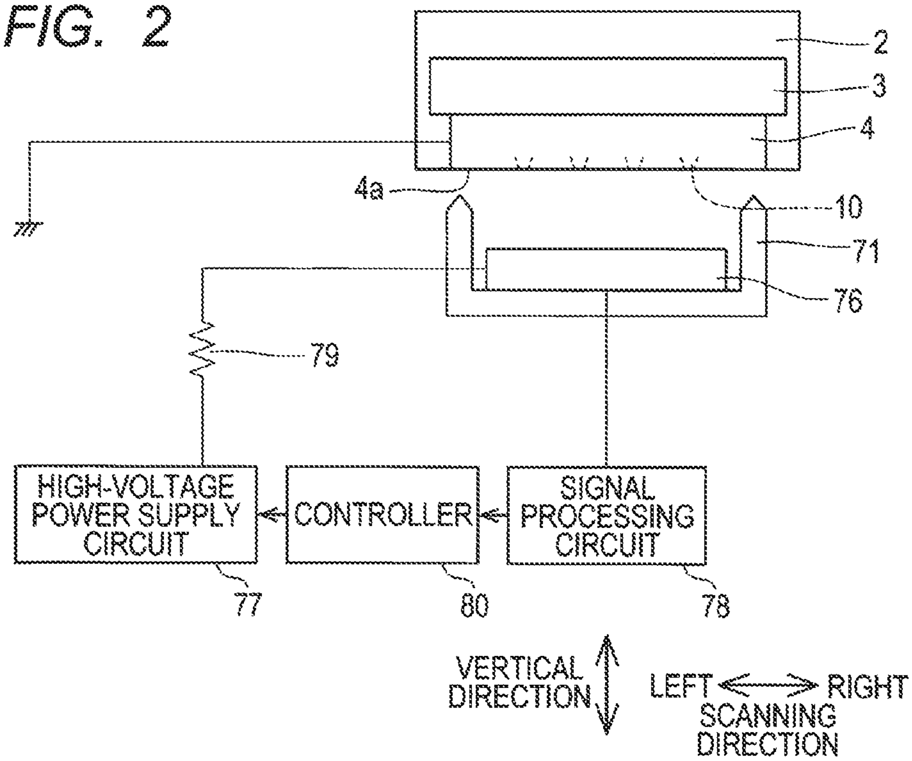
FIG. 2 is a diagram for explaining a detection electrode arranged in a cap and a connection relationship among the detection electrode, a high-voltage power supply circuit, and a signal processing circuit.

As shown in FIG. 2, a detection electrode 76 having a rectangular planar shape is arranged in the cap 71. The detection electrode 76 is connected to a high-voltage power supply circuit 77 via a resistor 79. A particular potential (for example, approximately 600 V) is applied to the detection electrode 76 by the high-voltage power supply circuit 77 at the time of inspection driving described later. The inkjet head 4 is held at the ground potential. As a result, a particular potential difference is generated between the inkjet head 4 and the detection electrode 76. A signal processing circuit 78 is connected to the detection electrode 76. The signal processing circuit 78 includes a differentiating circuit and so on, and outputs a signal that has undergone processing including differentiating processing with respect to a potential signal output from the detection electrode 76. That is, the signal output from the signal processing circuit 78 is a voltage signal depending on the voltage of the detection electrode 76. Alternatively, the signal output from the signal processing circuit 78 may be a current signal. In this embodiment, the combination of the detection electrode 76, the high-voltage power supply circuit 77, the signal processing circuit 78, and the resistor 79 serves as "signal output device" of this disclosure.

In a state where the carriage 2 is located at the maintenance position, a voltage is applied to the detection electrode 76 by the high-voltage power supply circuit 77, and inspection driving described later is not performed, the voltage of the signal (non-driving signal) output from the signal processing circuit 78 is a voltage V0 shown in FIGS. 3A and 3B assuming that there is no influence of noise.

In this embodiment, in a state where the carriage 2 is located at the maintenance position and a voltage is applied to the detection electrode 76 by the high-voltage power supply circuit 77, inspection driving is performed in which the inkjet head 4 is driven to eject ink from the nozzle 10 toward the detection electrode 76.

In a case where the nozzle 10 is not an abnormal nozzle having abnormality in ink ejection, the charged ink is ejected from the nozzle 10 when the inspection driving is performed. Thus, the potential of the detection electrode 76 changes until the charged ink approaches the detection electrode 76 and the ink lands on the detection electrode 76. Then, after the charged ink lands on the detection electrode 76, the potential of the detection electrode 76 returns, while attenuating, to the potential before the ink is ejected.

Figure 3A:
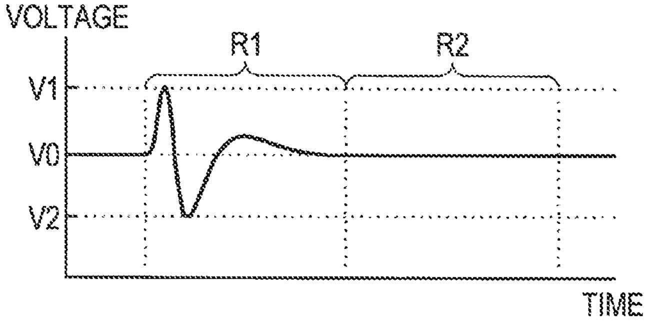
FIG. 3A is a diagram showing a signal output from the signal processing circuit when ink is ejected from a nozzle in inspection driving in a case where there is no noise.
Figure 3B:
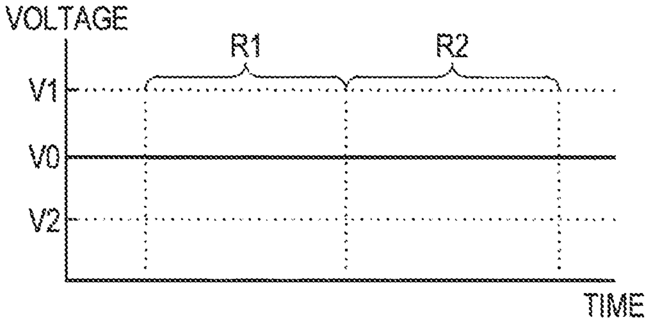
FIG. 3B is a diagram showing a signal output from the signal processing circuit when ink is not ejected from the nozzle in inspection driving in a case where there is no noise.

At this time, assuming that there is no influence of noise, as shown in FIG. 3A, the signal output from the signal processing circuit 78 rises from the voltage V0 to a voltage V1 higher than the voltage V0, and then drops to a voltage V2 lower than the voltage V0, and then returns to the voltage V0 by repeating rising and falling while attenuating. Thus, the signal output from the signal processing circuit 78 has a maximum (highest) value of voltage V1 and a minimum (lowest) value of voltage V2.

In a case where the nozzle 10 is an abnormal nozzle, even if the inspection driving is performed, ink is not ejected from the nozzle 10. Thus, as shown in FIG. 3B, the signal output from the signal processing circuit 78 does not change from the voltage V0.

The signal output from the signal processing circuit 78 includes a first signal portion R1 and a second signal portion R2 following the first signal portion R1. In the first signal portion R1, the value changes due to the inspection driving in a case where the nozzle 10 is not an abnormal nozzle (i.e., in a case where the nozzle is a normal nozzle). In the second signal portion R2, the value does not change by the inspection driving regardless of whether the nozzle 10 is an abnormal nozzle.

As described above, in this embodiment, the signal output from the signal processing circuit 78 at the time of inspection driving differs depending on whether the nozzle 10 is an abnormal nozzle. In this embodiment, this signal output is used to determine whether the nozzle 10 is an abnormal nozzle, as will be described later.

The plug 19 is connectable to an AC power source (not shown). When the plug 19 is inserted and connected to the AC power source, power (electric power) is supplied to the printer 1 from the plug 19. When the plug 19 is unplugged, the power supply from the plug 19 is cut off.

<Electrical Configuration of Printer>

Next, the electrical configuration of the printer 1 will be described. As shown in FIG. 4, the printer 1 includes a controller 80. The controller 80 includes a CPU (Central Processing Unit) 81, a ROM (Read Only Memory) 82, a RAM (Random Access Memory) 83, a flash memory 84, an ASIC (Application Specific Integrated Circuit) 85, and so on. The controller 80 controls the operations of the carriage motor 86, the inkjet head 4, the conveyance motor 87, the cap elevating mechanism 88, the suction pump 72, the high-voltage power supply circuit 77, and so on. The controller 80 receives signals from the signal processing circuit 78.

In the controller 80, only the CPU 81 may perform various processes, or only the ASIC 85 may perform various processes, or the CPU 81 and the ASIC 85 may cooperate with each other to perform various processes. Further, in the controller 80, one CPU 81 may perform processing independently, or a plurality of CPUs 81 may share the processing. Further, in the controller 80, one ASIC 85 may perform the processing independently, or a plurality of ASICs 85 may share the processing.

<Processing when Receiving Inspection Instruction Signal>

Next, the flow of processing of the controller 80 when receiving an inspection instruction signal instructing to inspect whether the nozzle 10 is an abnormal nozzle will be described. For example, when a user gives an instruction to inspect whether the nozzle 10 is an abnormal nozzle by operating an operation interface (not shown) of the printer 1, a PC connected to the printer, and so on, an inspection instruction signal is transmitted from the operation interface, the PC, and so on, and the controller 80 receives this inspection instruction signal. Alternatively, for example, the printer 1 may have a clock that outputs a signal indicating a time, and may be set to inspect whether a nozzle is an abnormal nozzle every time a particular time has come. In this case, when the clock transmits a signal indicating that the particular time has come, the controller 80 receives this signal as an inspection instruction signal.

Figure 5:
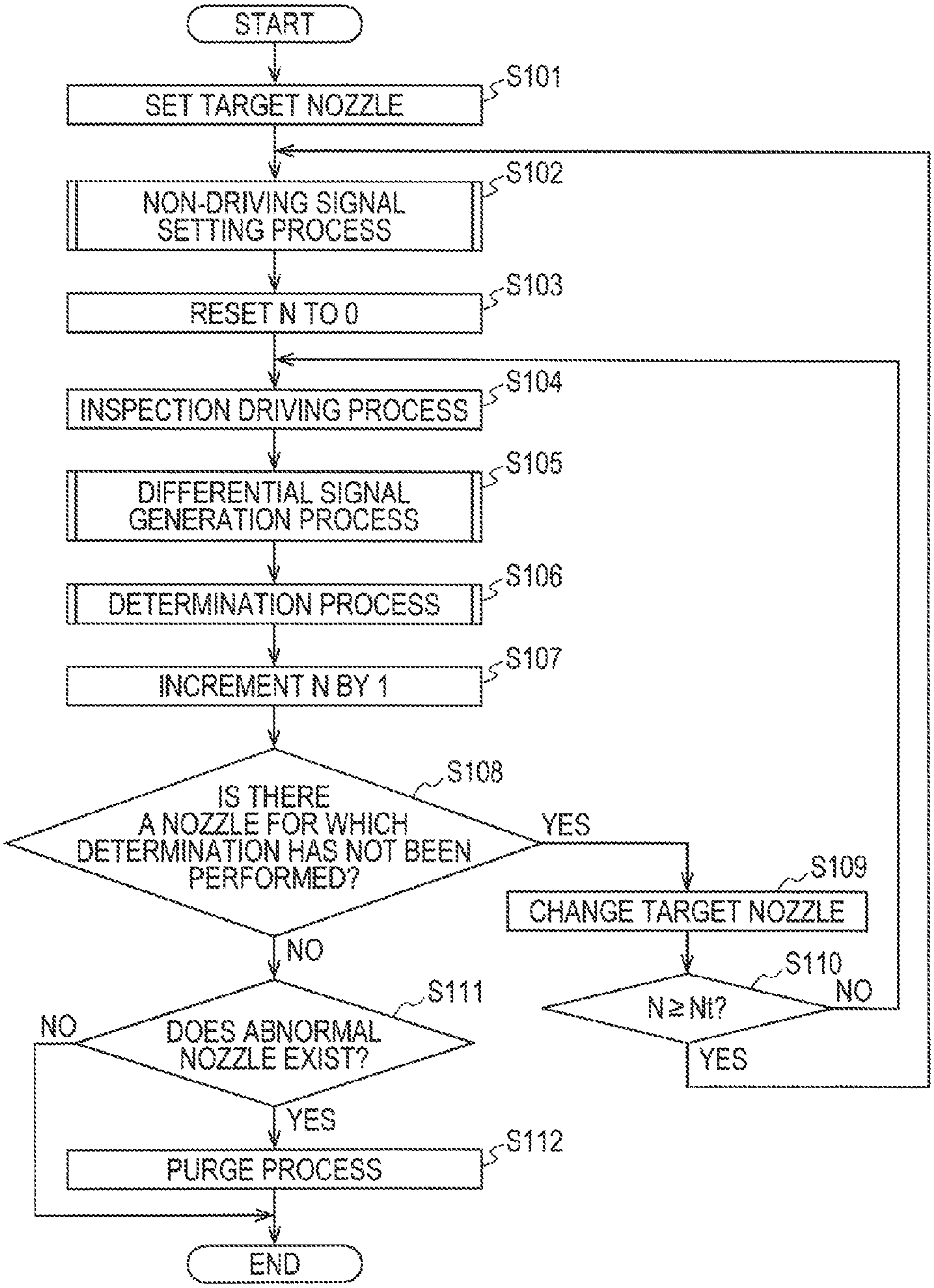
FIG. 5 is a flowchart showing a processing flow when an inspection instruction signal is received.

When an inspection instruction signal is received, the controller 80 executes processing in accordance with the flow in FIG. 5. In more detail, first, the controller 80 sets one of the plurality of nozzles 10 of the inkjet head 4 to a target nozzle for which it is inspected to determine whether it is an abnormal nozzle (S101).

Subsequently, the controller 80 executes a non-driving signal setting process (S102) and resets a value of a variable N to 0 (S103). In the non-driving signal setting process, the controller 80 sets a non-driving signal based on a signal output from the signal processing circuit 78 in a state where inspection driving is not performed. Details of the non-driving signal setting process will be described later. The variable N corresponds to the number of the nozzles 10 for which determination has been made on whether it is an abnormal nozzle after the non-driving signal is set.

Subsequently, the controller 80 executes an inspection driving process (S104). In the inspection driving process, the controller 80 causes the inkjet head 4 to perform inspection driving for the target nozzle in a state where a voltage is applied to the detection electrode 76 by the high-voltage power circuit 77 and acquires a determination signal output from the signal processing circuit 78 in response to the applying of the voltage.

Subsequently, the controller 80 executes a differential signal generation process (S105). In the differential signal generation process, the controller 80 superposes the non-driving signal set in the non-driving signal setting process in S102 on the determination signal acquired in S104, and generates a differential signal which is a signal of a difference between a value of the determination signal and a value of the non-driving signal at each timing. Here, "generating a differential signal by superposing the determination signal and the non-driving signal" means that generating a set of values obtained by aligning the positions of two signals on the time axis and subtracting one value from the other. Here, in a case where values of each signal are acquired continuously, the "timing" may be set arbitrarily. On the other hand, in a case where values of each signal are not acquired continuously, each of the determination signal and the non-driving signal is acquired at a particular sampling frequency. The sampling frequencies of the determination signal and the non-driving signal may be the same or different. Thus, in a case where values of each signal are not acquired continuously, the "timing" means a position on a time axis in a case where the two signals are superposed such that at least one sample (i.e., at least one piece of time-series data acquired by sampling) of the determination signal and at least one sample (i.e., at least one piece of time-series data acquired by sampling) of the non-driving signal overlap with each other on the time axis. In a case where the sampling frequencies of the determination signal and the non-driving signal are different, the time-series data may be supplemented by interpolation, for example. Hereinafter, it is simply referred to as "timing". Here, the non-driving signal set in the non-driving signal setting process in S102 and the determination signal acquired in S104 include noise components, but the differential signal acquired by the differential signal generation process in S105 has the noise component reduced from the determination signal. Details of the differential signal generation process will be described later.

Subsequently, the controller 80 executes a determination process (S106) and increases the value of the variable N by 1 (S107). In the determination process in S106, the controller 80 determines whether the target nozzle is an abnormal nozzle based on the differential signal. Details of the determination process will be described later.

Subsequently, the controller 80 determines whether there is any nozzle 10 for which the determination on whether it is an abnormal nozzle has not been made (S108). If there is an undetermined nozzle 10 (S108: YES), the controller 80 changes the target nozzle to one of the undetermined nozzles 10 (S109). If the variable N is smaller than a particular value Nt (S110: NO), the processing returns to S104. If the variable N is larger than or equal to the particular value Nt (S110: YES), the processing returns to S102. Thus, determination is sequentially made on whether each of the plurality of nozzles 10 of the inkjet head 4 is an abnormal nozzle by the processing from S104 to S106. Each time the variable N reaches the particular value Nt, that is, each time the determination is made for Nt pieces of the nozzles 10 on whether it is an abnormal nozzle, the non-driving signal setting process is executed.

If there is no undetermined nozzle 10 (S108: NO), the controller 80 determines whether an abnormal nozzle exists based on the result of the determination process in S106 for the plurality of nozzles 10 of the inkjet head 4 (S111). If no abnormal nozzle exists (S111: NO), the controller 80 finishes the processing. If an abnormal nozzle exists (S111: YES), the controller 80 executes a purge process (S112) and then, finishes the processing. In the purge process, the controller 80 causes suction purge to be performed by controlling the suction pump 72 and so on and recovers the abnormal nozzles.

<Non-Driving Signal Setting Process>

Subsequently, the non-driving signal setting process in S102 will be described in detail. In the non-driving signal setting process, the controller 80 executes the processing in accordance with the flow in FIG. 6.

Explaining in more detail, in the non-driving signal setting process, the controller 80 continuously acquires a plurality (3 to 5, for example) of the non-driving signals based on the signal output from the signal processing circuit 78 in a state where the inspection driving is not performed.

Figure 9A:
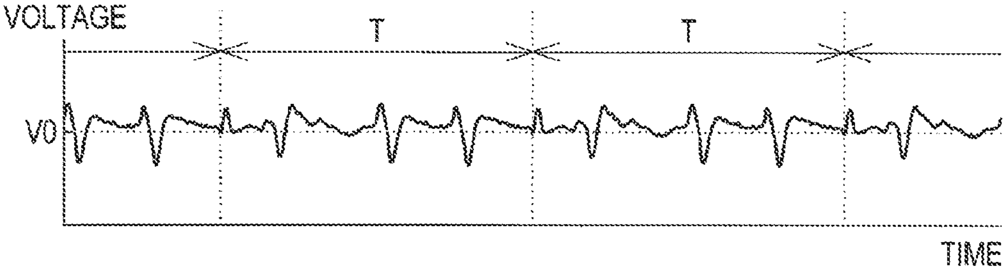
FIG. 9A is a diagram showing an example of an actual non-driving signal including noise.

Here, the non-driving signal contains a noise due to an influence of power supplied from an AC power source through the plug 19. As shown in FIG. 9A, for example, the non-driving signal contains a signal repeated with a cycle T of the power supplied from the AC power source. For example, the cycle T is 1/60 seconds in a case where the AC power source is 60 Hz, and is 1/50 seconds in a case where the AC power source is 50 Hz. Each of the non-driving signals acquired in S201 is a signal of time longer than the cycle T.

Subsequently, the controller 80 calculates a sum of squares A for each of all the combinations of two of the plurality of non-driving signals acquired in S201 (S202). In S202, the controller 80 superposes the two non-driving signals by slightly shifting a position of each on a time axis and calculates a sum of squares A0 which is a total sum of the squares of a difference in values of the two non-driving signals at each timing for each case. Then, the smallest one in the calculated plurality of sum of squares A0 is set to the sum of squares A.

If none of the sum of squares A calculated for each of the two non-driving signals of all the combinations in the plurality of non-driving signals acquired in S201 is larger than or equal to a particular value At (S203: NO), the controller 80 sets one of the plurality of non-driving signals acquired in S201 to the non-driving signal to be used for generating the differential signal (S204), and the processing returns to the flow in FIG. 5. If any one of the calculated sum of squares A is larger than or equal to the particular value At (S203: YES), the processing returns to S201. In this way, a plurality of non-driving signals is repeatedly acquired until all the sum of squares A calculated for all the combination are smaller than the particular value At. Here, if any one of the calculated sum of squares A is larger than or equal to the particular value At even after a plurality of non-driving signals is repeatedly acquired for a particular number of times, the processing may be finished after notifying an error.

<Differential Signal Generation Process>

Next, the differential signal generation process in S105 will be described. In the differential signal generation process, the controller 80 executes processing in accordance with the flow in FIG. 7.

Explaining in more detail, the controller 80 first resets a value of a variable K to 0 (S301). The variable K corresponds to the number of times that a sum of squares B0 is calculated as described later. Subsequently, the controller 80 superposes a determination signal and a non-driving signal based on initial setting relating to a position on the time axis where the determination signal and the non-driving signal are superposed (S302). The initial setting is stored in a flash memory 84 in advance, for example. The controller 80 calculates a sum of squares B0 in the second signal portion R2 of the determination signal and a portion corresponding to the second signal portion R2 of the non-driving signal superposed in S302 (S303). The sum of squares B0 is a total sum of the squares of a difference between the value of the determination signal and the value of the non-driving signal at each timing. The controller 80 stores the sum of squares B0 as a sum of squares B in the flash memory 84 (S304). The controller 80 increments the value of the variable K by 1 (S305). The above-mentioned initial setting may be the setting of the positions of the non-driving signal and the determination signal on the time axis, and may be an arbitrary position among a plurality of positions where the non-driving signal and the determination signal will hit (match) somewhere. For example, in a case where the non-driving signal is acquired for one second, the initial setting may be to superpose the 0.5 sec position of the determination signal on the 0.1 sec position of the non-driving signal. These times are just an example. Basically, the controller 80 identifies the position on the time axis where the difference is the smallest by shifting from the initial setting position little by little (by ΔT). The position to be identified is the first hit position when the position is searched for within one cycle of the noise cycle T.

Subsequently, the controller 80 superposes the determination signal and the non-driving signal with a shift of time ΔT (S306). The controller 80 calculates the sum of squares B0 in the second signal portion R2 of the determination signal and the portion corresponding to the second signal portion R2 of the non-driving signal superposed in S306 (S307). The sum of squares B0 is the total sum of the squares of the difference between the value of the determination signal and the value of the non-driving signal at each timing. The controller 80 increments the value of the variable K by 1 (S308). Here, the time ΔT is time shorter than the cycle T.

If the sum of squares B0 calculated in S307 is larger than or equal to the sum of squares B stored in the flash memory 84 (S309: NO), the processing proceeds to S311. If the sum of squares B0 calculated in S307 is smaller than the sum of squares B stored in the flash memory 84 (S309: YES), the controller 80 updates the sum of squares B stored in the flash memory 84 with the sum of squares B0 calculated in S307, and updates the setting on the position on the time axis where the determination signal and the non-driving signal are superposed, which is stored in the flash memory 84, with that used for the calculation of the sum of squares B0 in S307 (S310). Then, the processing proceeds to S311.

In S311, the controller 80 determines whether (K×ΔT) is larger than or equal to the cycle T. If (K×ΔT) is smaller than the cycle T (S311: NO), the processing returns to S306. If (K×ΔT) is larger than or equal to the cycle T (S311: YES), the controller 80 generates a differential signal by superposing the determination signal and the non-driving signal based on the setting on the position on the time axis where the determination signal and the non-driving signal are superposed, which is stored in the flash memory 84 (S312). The processing then returns to the flow in FIG. 5.

Figure 9B:
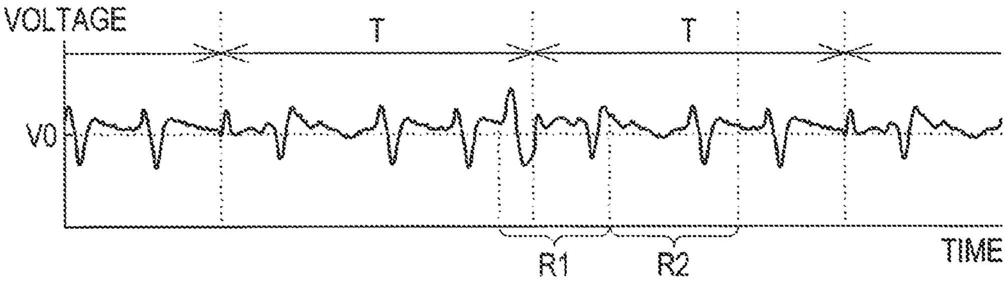
FIG. 9B is a diagram showing an example of an actual determination signal including noise when ink is ejected by the inspection driving.

As shown in FIG. 9A, if the target nozzle is an abnormal nozzle, the determination signal is a signal similar to the non-driving signal. If the target nozzle is not an abnormal nozzle, as shown in FIG. 9B, the determination signal is a signal changed from the signal in FIG. 9A due to a change in the voltage of the detection electrode 76 at the inspection driving. Thus, the differential signal is a signal substantially the same as FIG. 3A when the target nozzle is not an abnormal nozzle, and is a signal substantially the same as FIG. 3B when the target nozzle is an abnormal nozzle. The differential signal is a signal indicating the difference between the value of the determination signal and the value of non-driving signal at each timing, and the differential signal is obtained by superposing the determination signal and the non-driving signal at the position on the time axis where the sum of squares B0 becomes the minimum. In the differential signal, the voltage V0 in FIGS. 3A and 3B is substantially 0.

<Determination Process>

Figure 8:
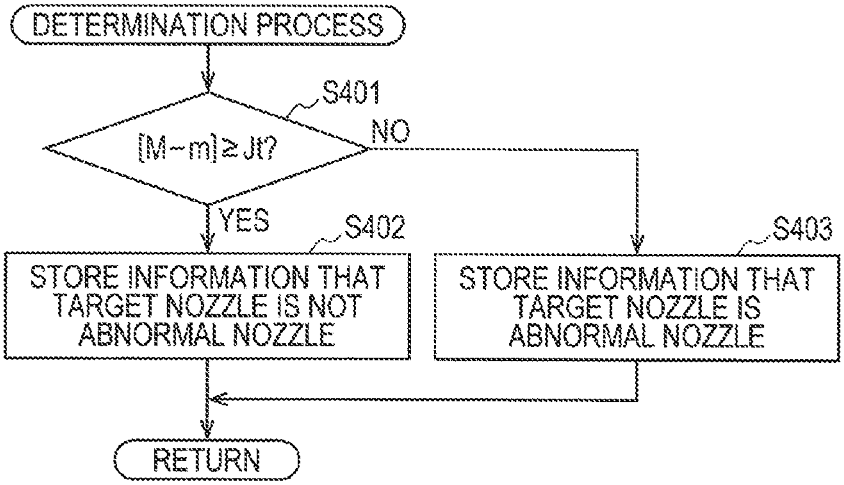
FIG. 8 is a flowchart showing a flow of a determination process of FIG. 5.

Next, the determination process in S106 will be described. In the determination process, the controller 80 executes processing in accordance with the flow in FIG. 8.

Explaining in more detail, the controller 80 determines whether a [M−m] indicating a difference between a maximum value M and a minimum value m of the differential signal generated in the differential signal generation process in S105 is larger than or equal to a threshold value Jt (S401). If [M−m] is larger than or equal to the threshold value Jt (S401: YES), the controller 80 stores information indicating that the target nozzle is not an abnormal nozzle in the flash memory 84 (S402), and the processing returns to the flow in FIG. 5. If [M−m] is smaller than the threshold value Jt (S401: NO), the controller 80 stores information indicating that the target nozzle is an abnormal nozzle in the flash memory 84 (S403), and the processing returns to the flow in FIG. 5.

Effects

In this embodiment, the determination signal and the non-driving signal have the same noise component. Thus, the differential signal, which is a signal of the difference between the determination signal and the non-driving signal at each timing, is a signal obtained by reducing the noise component from the determination signal. Thus, the determination on whether it is an abnormal nozzle is made accurately based on the differential signal.

In this embodiment, the differential signal is generated by superposing the determination signal and the non-driving signal on the time axis such that a difference between the value of the determination signal and the value of the non-driving signal becomes the smallest. Thus, the differential signal becomes a signal with a small noise influence.

In this embodiment, the differential signal is generated by superposing the determination signal and the non-driving signal on the time axis such that the total sum of the squares of the difference between the value of the determination signal and the value of the non-driving signal at each timing becomes the smallest. Thus, the difference between the value of the determination signal and the value of the non-driving signal is made the smallest.

In this embodiment, the difference between the value of the determination signal and the value of the non-driving signal is squared. By squaring the value, a case where the difference value is large is more weighted than a case where the difference value is small and gives a larger influence on the value of the total sum. Thus, a value having a large deviation is extracted easily.

If the noise component is the same, the second signal portion of the determination signal and the portion corresponding to the second signal portion of the non-driving signal are substantially the same signals. In this embodiment, the differential signal is generated by superposing the determination signal and the non-driving signal such that the difference between the second signal portion of the determination signal and the portion corresponding to the second signal portion of the non-driving signal is the smallest. Thus, the differential signal has a small noise influence.

In this embodiment, since the differential signal is a signal obtained by reducing the noise component from the determination signal, an abnormal nozzle may be determined accurately based on whether the [M−m] indicating a difference between the maximum value M and the minimum value m of the differential signal is smaller than the threshold value Jt.

The noise in the non-driving signal fluctuates with the cycle T of the power supplied from the AC power source. Thus, in this embodiment, the non-driving signal is a signal longer than the cycle T. Thus, the non-driving signal is sufficiently long for adjustment of the position on the time axis where the determination signal and the non-driving signal are superposed based on the cycle T of the power supplied from the AC power source.

In this embodiment, the non-driving signal setting process is executed immediately before the inspection driving process. That is, the non-driving signal is acquired immediately before the inspection driving. Thus, the determination signal and the non-driving signal contain noise components close to each other.

With elapse of time, the noise component in the signal output from the signal processing circuit 78 may change in some cases. In this embodiment, each time the controller 80 determines for a particular number (Nt) of the nozzles 10 whether it is an abnormal nozzle, the non-driving signal is acquired so as to update the non-driving signal used for generation of the differential signal. Thus, even if the noise component in the signal output from the signal processing circuit 78 changes with the elapse of time, the differential signal with a small noise influence is acquired.

An unexpected noise may be mixed into the printer 1 from outside in some cases. At this time, the unexpected noise component may be contained in the non-driving signal, while the unexpected noise component may not be contained in the determination signal. In this case, if the differential signal is generated by using the non-driving signal containing the unexpected noise component, the differential signal has a large influence of the unexpected noise component. Thus, in this embodiment, a plurality of the non-driving signals is acquired continuously, and if variation of these non-driving signals is large and is not within a particular range, the non-driving signal is acquired again. Thus, the differential signal is generated based on the non-driving signal not containing the unexpected noise, and the differential signal is not influenced by the unexpected noise.

In this embodiment, the controller 80 determines whether the variation in the plurality of non-driving signals is within the particular range based on whether any one of the sum of squares A calculated for all the combinations of the two non-driving signals in the plurality of non-driving signals is larger than or equal to the particular value At.

Modifications

While the disclosure has been described in detail with reference to the above aspects thereof, it would be apparent to those skilled in the art that various changes and modifications may be made therein without departing from the scope of the claims.

In the above-described embodiment, the plurality of non-driving signals is continuously acquired, and the sum of squares A is calculated for all the combinations of the two non-driving signals in these plurality of non-driving signals. And, if none of the sum of squares A is larger than or equal to the particular value At, the differential signal is generated by using the acquired non-driving signal. If any one of the sum of squares A is larger than or equal to the particular value At, the non-driving signal is acquired again. However, this disclosure is not limited to this.

Figure 6:
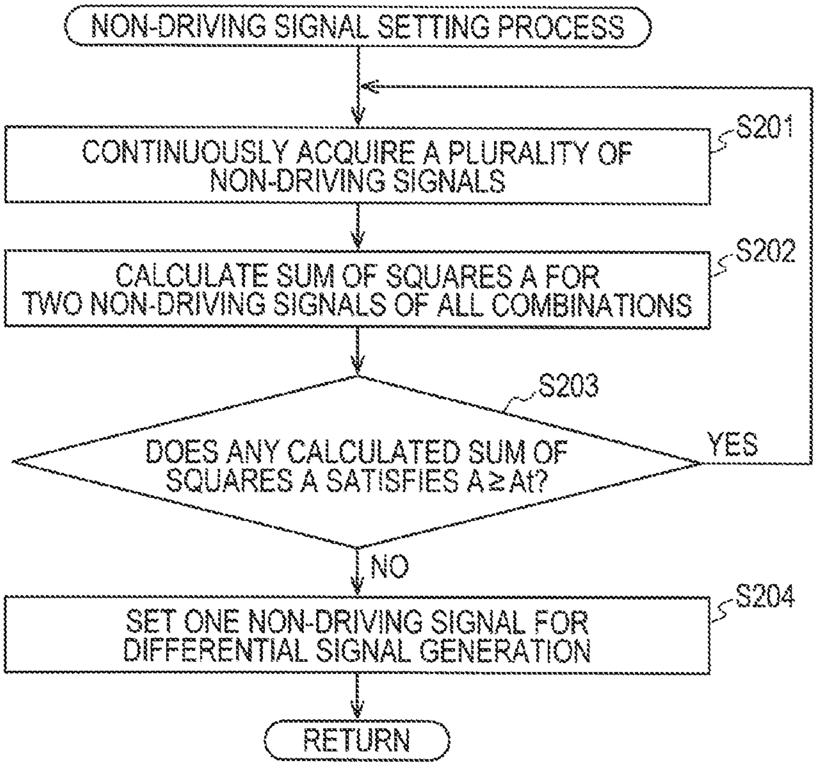
FIG. 6 is a flowchart showing a flow of a non-driving signal setting process of FIG. 5.
Figure 10:
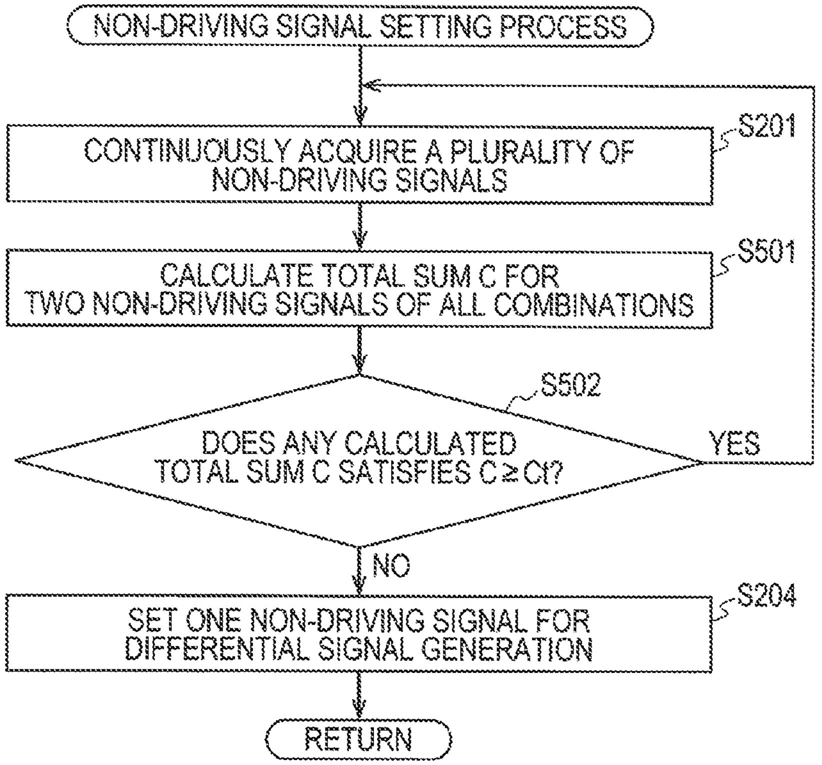
FIG. 10 is a flowchart showing a flow of a non-driving signal setting process.

In a modification 1, in the non-driving signal setting process, the controller 80 executes processing in accordance with the flow in FIG. 10. In the flow in FIGS. 10, S202 and S203 in the flow in FIG. 6 are replaced with S501 and S502, respectively.

In S501, the controller 80 calculates a total sum C for each of all the combinations of the two non-driving signals in the plurality of non-driving signals acquired in S201. At this time, the controller 80 superposes the two non-driving signals by slightly shifting the position on the time axis and calculates a total sum C0 of the difference (more specifically, the absolute value of the difference) of the values of the two non-driving signals at each timing for each case. And, the smallest one in the calculated plurality of total sums C0 is set to the total sum C.

If none of the total sums C calculated for all the combinations of the two non-driving signals in the plurality of non-driving signals acquired in S201 is larger than or equal to a particular value Ct (S502: NO), the controller 80 sets one of the plurality of non-driving signals acquired in S201 to the non-driving signal to be used for generation of the differential signal (S803) and returns to the flow in FIG. 5. If any one of the total sums C calculated for all the combinations is larger than or equal to the particular value Ct (S203: YES), the processing returns to S201.

In the modification 1, the controller 80 determines whether the variation in the plurality of non-driving signals is within the particular range based on whether any one of the total sums C of the difference of the values at each timing for all the combinations of the two non-driving signals in the plurality of non-driving signals is larger than or equal to the particular value Ct.

Whether the variation in the plurality of non-driving signals is within the particular range may be determined by a method other than the embodiment and the modification 1. For example, the determination may be made based on whether any one of average values of the difference in the value at each timing in all the combinations of the two non-driving signals in the plurality of non-driving signals is larger than or equal to a particular value. Alternatively, the determination may be made based on whether any one of maximum values of the difference in the value at each timing in all the combinations of the two non-driving signals in the plurality of non-driving signals is larger than or equal to a particular value.

Further, it is not limited to a method that, when the plurality of non-driving signals is acquired and the variation of the plurality of non-driving signals is within the particular range, the differential signal is generated by using the acquired non-driving signals. For example, in a modification 2, the controller 80 executes the processing in accordance with the flow in FIG. 11 when an inspection instruction signal is received.

By explaining in more detail, in the modification 2, the controller 80 sets the target nozzle similarly to the embodiment (S101). Then, the controller 80 acquires a non-driving signal output from the signal processing circuit 78 (S601). After that, the controller 80 executes processing from S103 to S105 similar to those in the embodiment.

Subsequently, the controller 80 calculates a sum of squares X which is the total sum of squares of a value at each timing in a portion corresponding to the second signal portion R2 of the differential signal generated in S105 (S602). If the sum of squares X exceeds a particular value Xt (S603: YES), the controller 80 acquires a non-driving signal again similarly to S601 (S604). After the value of the variable N is reset to 0 (S605), the processing returns to S105. If the sum of squares X is smaller than or equal to the particular value Xt (S603: NO), the processing from S106 to S112 is executed similarly to the embodiment.

If noise components in the signals output from the signal processing circuit 78 are the same between the time of acquisition of the non-driving signal and the time of acquisition of the determination signal, the sum of squares X in the portion corresponding to the second signal portion R2 of the differential signal is substantially 0. If the noise components in the signals output from the signal processing circuit 78 are significantly different between the time of acquisition of the non-driving signal and the time of acquisition of the determination signal, the sum of squares X in the portion corresponding to the second signal portion R2 of the differential signal is large. Thus, in the modification 2, when the sum of squares X exceeds the particular value Xt, a non-driving signal is acquired again, and the differential signal is generated by using this non-driving signal.

Figure 11:
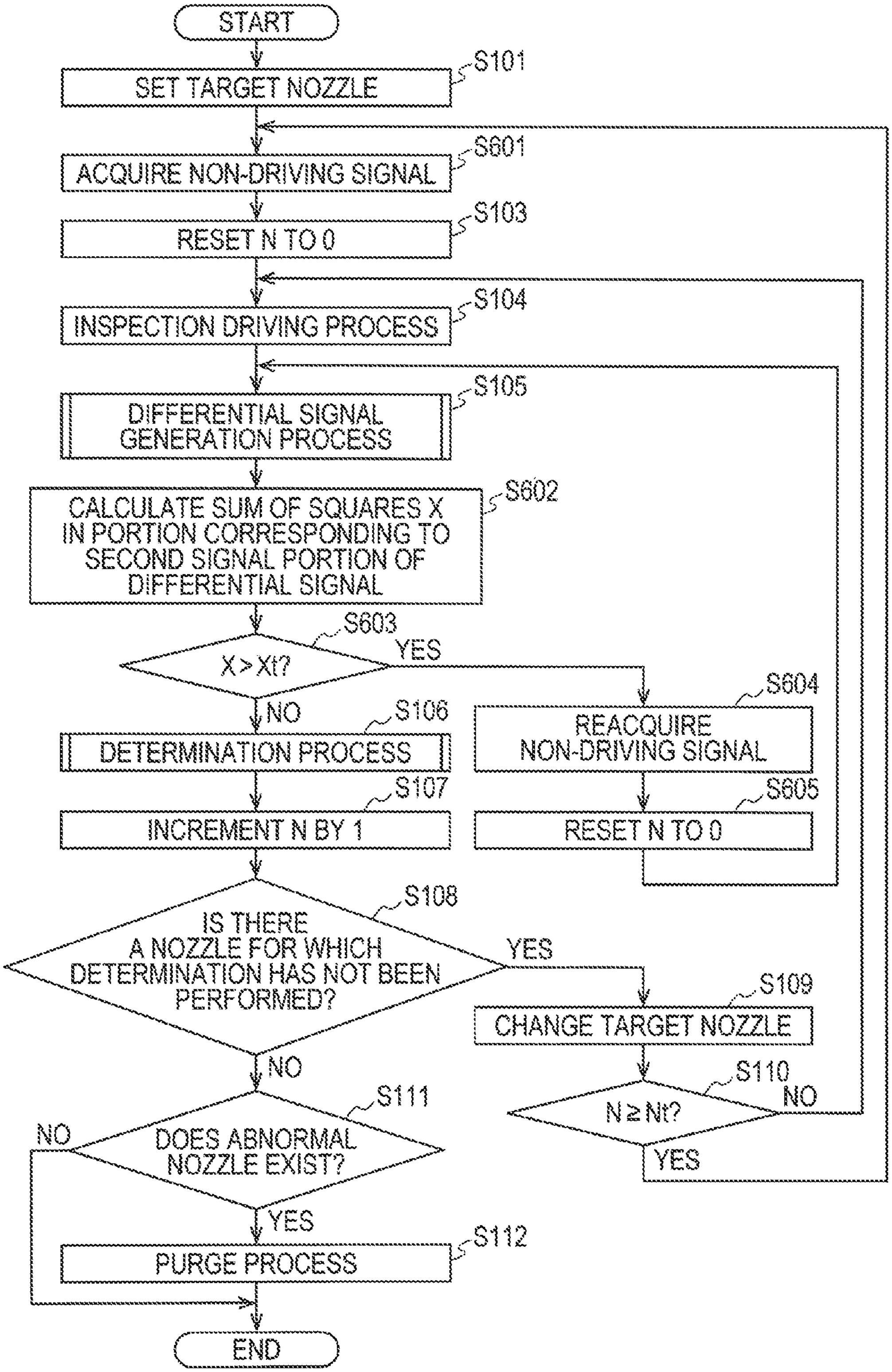
FIG. 11 is a flowchart showing a processing flow when an inspection instruction signal is received.
Figure 12:
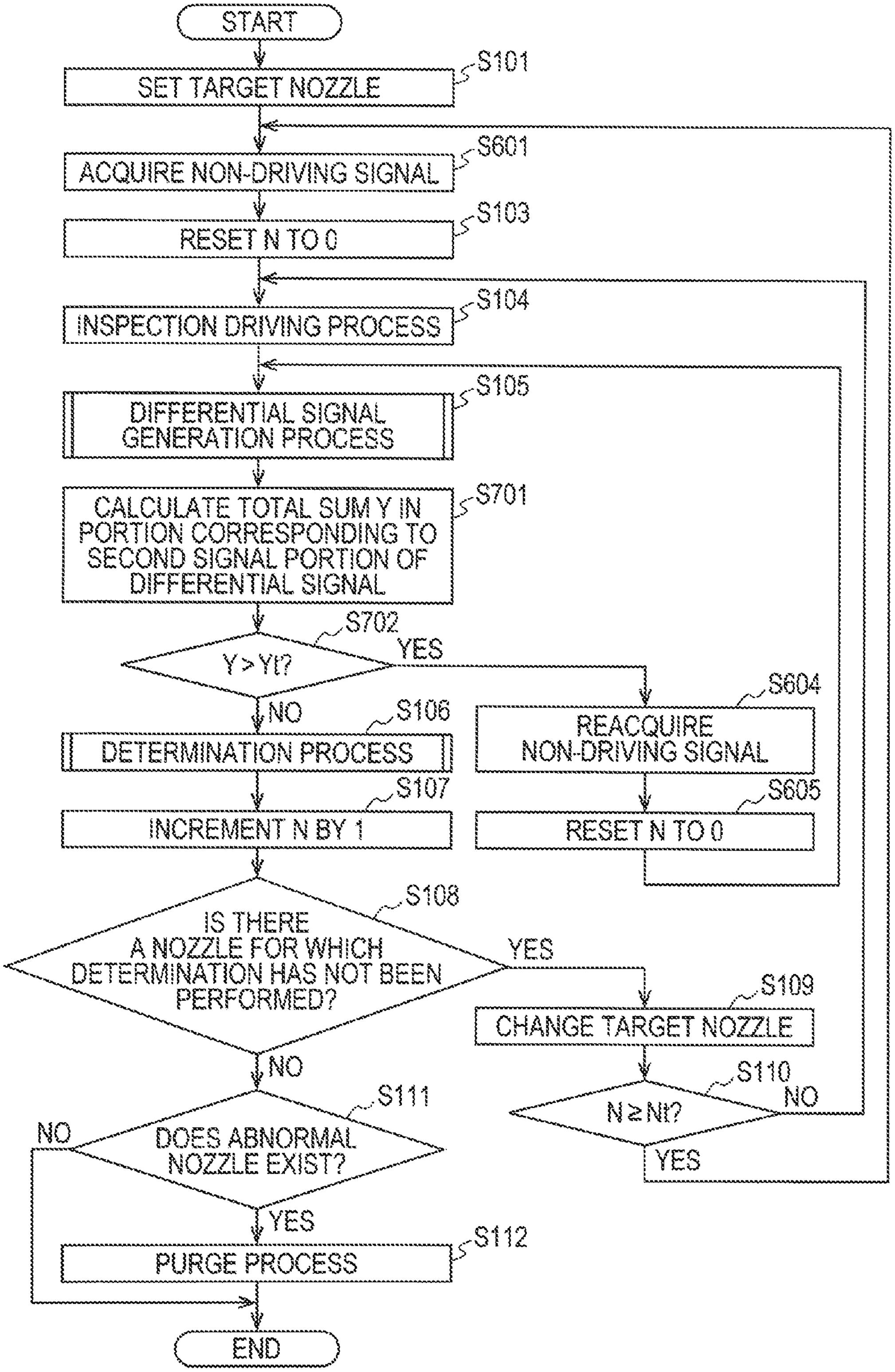
FIG. 12 is a flowchart showing a processing flow when an inspection instruction signal is received.

In a modification 3, when an inspection instruction signal is received, the controller 80 executes processing in accordance with the flow in FIG. 12. In the flow in FIGS. 12, S602 and S603 in the flow in FIG. 11 are replaced with S701 and S702, respectively.

In S701, the controller 80 calculates a total sum Y of the value (more specifically, the absolute value) at each timing of a portion corresponding to the second signal portion R2 of the differential signal generated in S105. If the total sum Y exceeds a particular value Yt (S702: YES), the controller 80 executes processing in S604 and S605, and the processing returns to S105. If the total sum Y is smaller than or equal to the particular value Yt (S702: NO), similarly to the embodiment, processing from S106 to S112 is executed.

If the noise components in the signals output from the signal processing circuit 78 are the same between the time of acquisition of the non-driving signal and the time of acquisition of the determination signal, the total sum Y in the portion corresponding to the second signal portion R2 of the differential signal is substantially 0. If the noise components in the signals output from the signal processing circuit 78 are significantly different between the time of acquisition of the non-driving signal and the time of acquisition of the determination signal, the total sum Y in the portion corresponding to the second signal portion R2 of the differential signal is large. Thus, in the modification 3, when the total sum Y exceeds the particular value Yt, the non-driving signal is acquired again to generate the differential signal again.

In the modifications 2 and 3, the controller 80 determines whether the sum of squares X and the total sum Y in the portion corresponding to the second signal portion R2 of the differential signal exceed the particular values Xt and Yt, respectively, but this disclosure is not limited to this. In the modifications 2 and 3, it may be determined whether the sum of squares or the total sum in the entirety including the first signal portion R1 and the second signal portion R2 of the differential signal exceeds a threshold value. In this case, the calculated sum of squares and total sum become larger than the cases in the modifications 2 and 3. But, if a difference in the noise components between the non-driving signal and the determination signal is small, the sum of squares and the total sum become smaller as compared with the case where this difference is large. Thus, by setting the particular value to a value larger than the cases of the modifications 2 and 3, the differential signal is generated in a state where the difference in the noise components between the non-driving signal and the determination signal is small.

Figure 13:
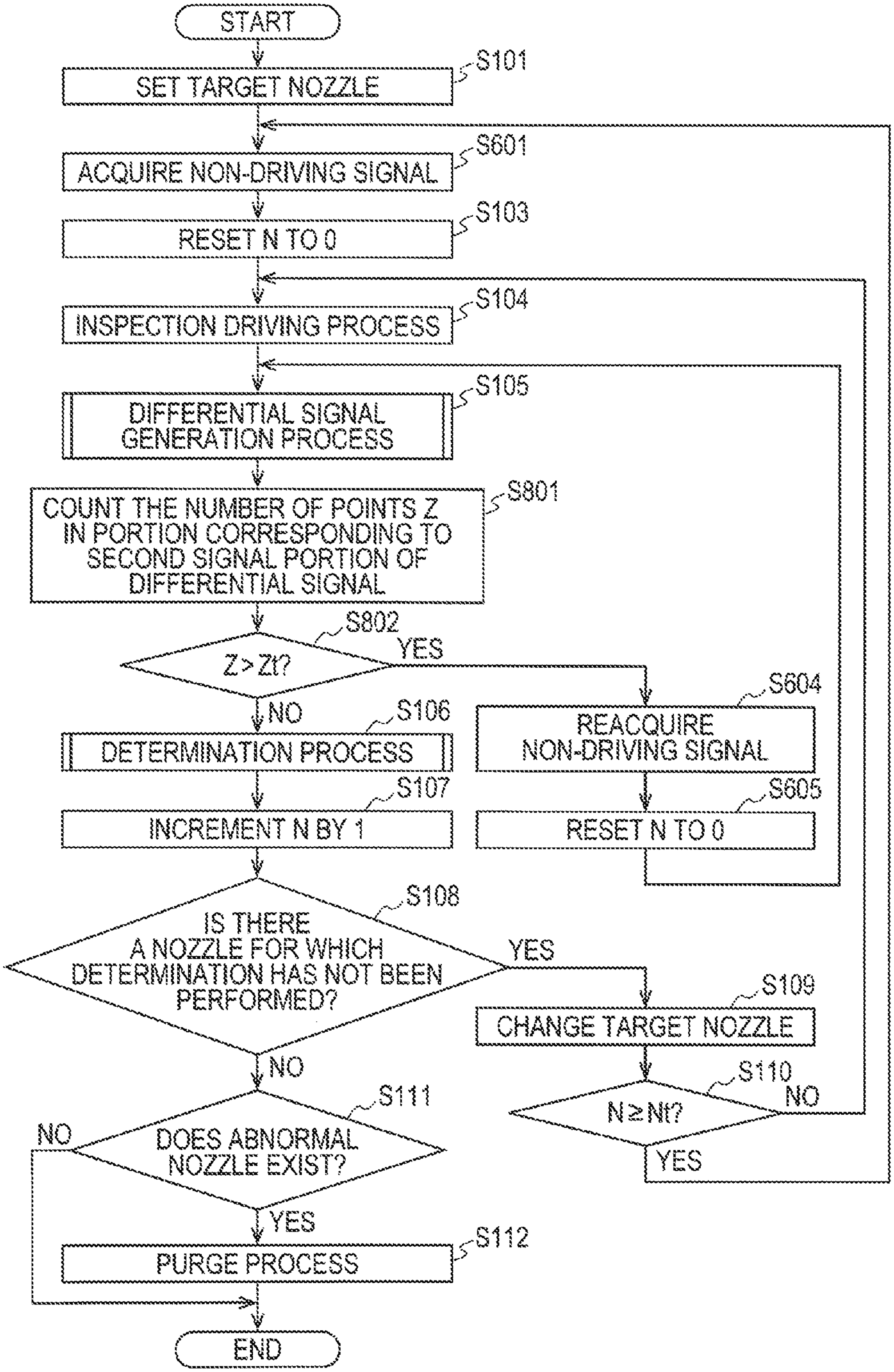
FIG. 13 is a flowchart showing a processing flow when an inspection instruction signal is received.

In a modification 4, when an inspection instruction signal is received, the controller 80 executes processing in accordance with the flow in FIG. 13. In the flow in FIGS. 13, S602 and S603 in the flow in FIG. 11 are replaced with S801 and S802, respectively.

In S801, the controller 80 counts a number Z of points on the time axis where the value of the differential signal exceeds a particular value in the portion corresponding to the second signal portion R2 of the differential signal generated in S105. If the number Z exceeds a particular number Zt (X802: YES), the processing in S604 and S605 is executed, and the processing returns to S105. If the number Z is smaller than or equal to the particular number Zt, the processing from S106 to S112 is executed similarly to the embodiment.

If the noise components in the signals output from the signal processing circuit 78 are the same between the time of acquisition of the non-driving signal and the time of acquisition of the determination signal, a difference in the values between the second signal portion R2 of the determination signal and the portion corresponding to the second signal portion R2 of the non-driving signal is substantially 0. If the noise components in the signals output from the signal processing circuit 78 are significantly different between the time of acquisition of the non-driving signal and the time of acquisition of the determination signal, the difference in the values between the second signal portion R2 of the determination signal and the portion corresponding to the second signal portion R2 of the non-driving signal is large, and the number of the points having larger values increases in the signal portion corresponding to the second signal portion R2 of the differential signal. Thus, in the modification 4, if the number Z of the points whose values exceed a particular value exceeds the particular number Zt in the signal portion corresponding to the second signal portion of the differential signal, the non-driving signal is acquired again to generate the differential signal.

In the embodiment, in the differential signal generation process, the non-driving signal and the determination signal are superposed by shifting a position on the time axis by ΔT each time, and the sum of squares B0 is calculated for each of the cases. The differential signal is generated by superposing the non-driving signal and the determination signal such that the sum of squares B0 becomes the minimum. However, this disclosure is not limited to this.

Figure 7:
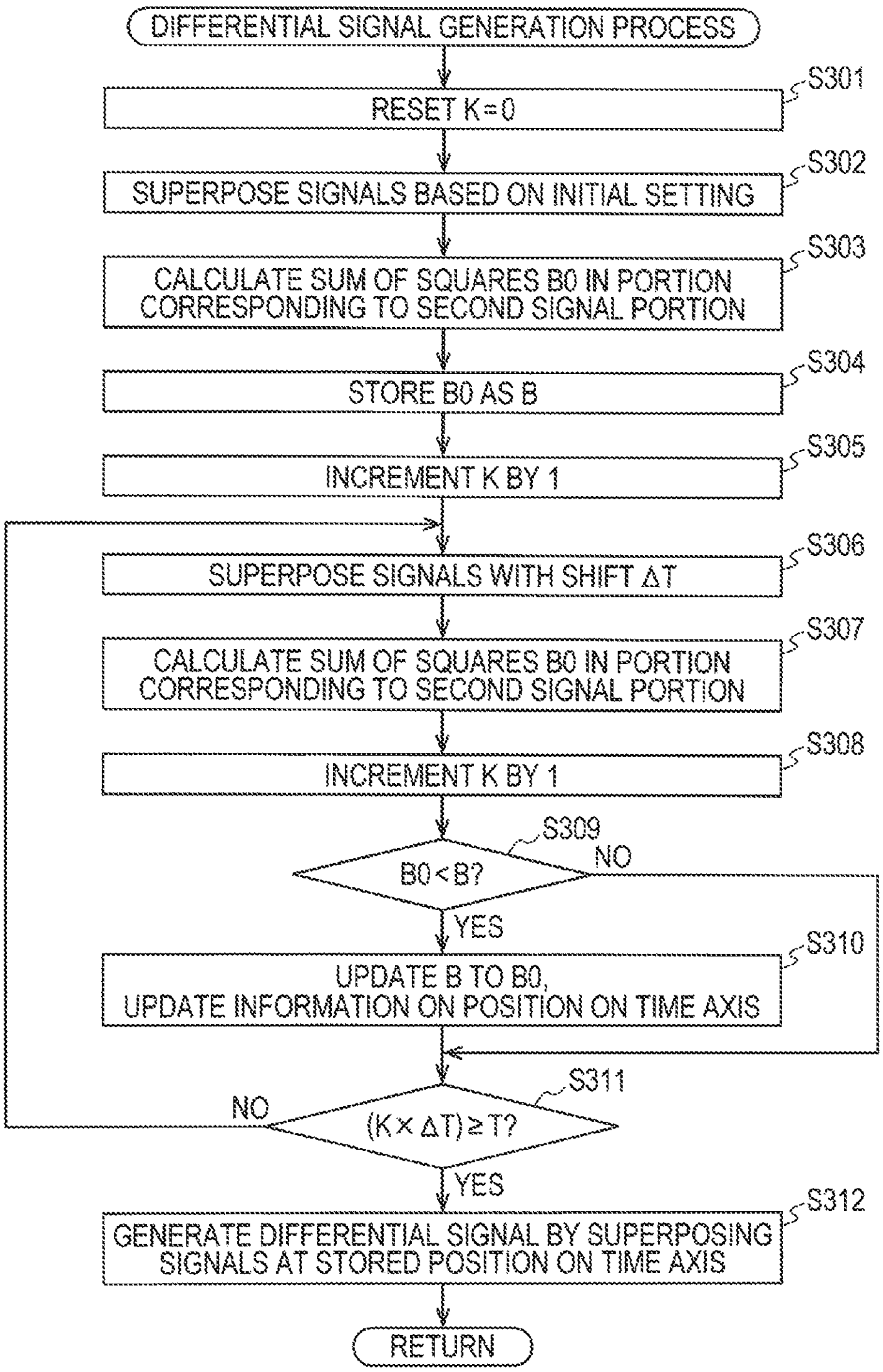
FIG. 7 is a flowchart showing a flow of a differential signal generation process of FIG. 5.
Figure 14:
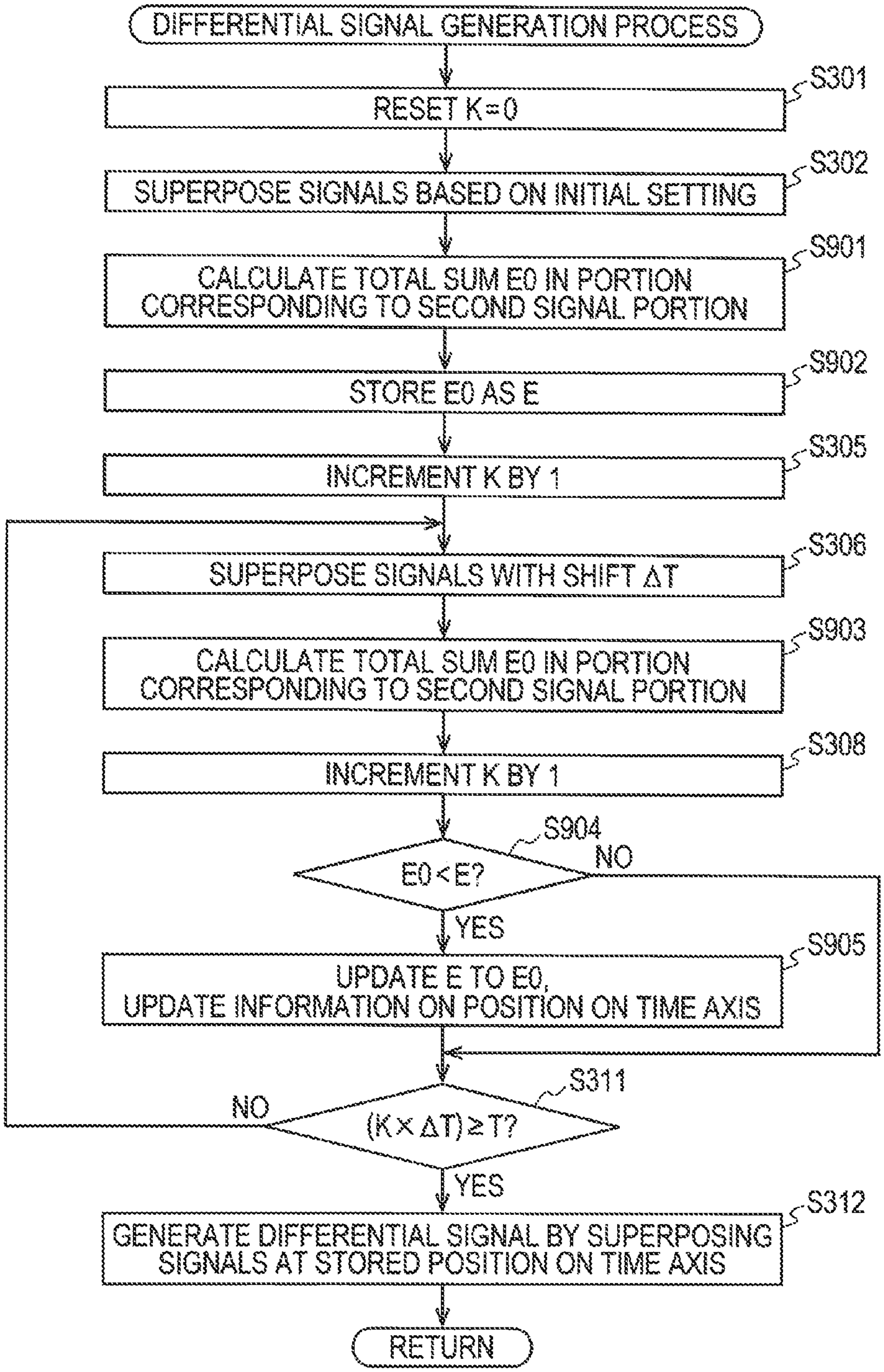
FIG. 14 is a flowchart showing a flow of a differential signal generation process.

In a modification 5, in the differential signal generation process, the controller 80 executes processing in accordance with the flow in FIG. 14. In the flow in FIGS. 14, S303, S304, S307, S309, and S310 in the flow in FIG. 7 are replaced with S901, S902, S903, S904, and S905, respectively.

In S901, the controller 80 calculates a total sum E0 of the difference (more specifically, the absolute value of the difference) between the value of the determination signal and the value of the non-driving signal at each timing in the second signal portion R2 of the determination signal and the portion corresponding to the second signal portion R2 of the non-driving signal which are superposed by the initial setting. In S902, the controller 80 stores the total sum E0 calculated in S901 as a total sum E in the flash memory 84. In S903, the controller 80 calculates the total sum E0 of the difference between the value of the determination signal and the value of the non-driving signal at each timing in the second signal portion R2 of the determination signal and the portion corresponding to the second signal portion R2 of the non-driving signal, which are superposed in the setting after the position on the time axis is shifted by ΔT in S306 executed immediately before. In S904, the controller 80 determines whether the total sum E0 calculated in S903 is smaller than the total sum E stored in the flash memory 84.

If the total sum E0 is larger than or equal to the total sum E (S904: NO), the processing proceeds to S311. If the total sum E0 is smaller than the total sum E (S904: YES), the controller 80 updates the total sum E stored in the flash memory 84 with the total sum E0 calculated in S903 and updates the setting, stored in the flash memory 84, on the position on the time axis where the determination signal and the non-driving signal are superposed with the setting used for calculation of the total sum E0 in S903 (S905). Then, the processing proceeds to S311.

In the modification 5, the differential signal is generated by superposing the determination signal and the non-driving signal such that the total sum E0 of the difference between the value of the determination signal and the value of the non-driving signal at each timing is the smallest. Thus, the difference between the value of the determination signal and the value of the non-driving signal becomes the smallest.

When the differential signal is generated, a method of superposing the determination signal and the non-driving signal such that the difference between the value of the determination signal and the value of the non-driving signal is the smallest is not limited to those described in the embodiment and the modification 5. The determination signal and the non-driving signal may be superposed such that the difference between the value of the determination signal and the value of the non-driving signal becomes the smallest by another method.

For example, the non-driving signal and the determination signal are superposed by shifting the position on the time axis by ΔT each time, the average value of the difference of the value of the second signal portion of the determination signal and the value of the non-driving signal is calculated, and the position of each of the determination signal and the non-driving signal on the time axis to be superposed may be set such that this average value becomes the smallest.

Alternatively, for example, the non-driving signal and the determination signal are superposed by shifting the position on the time axis by ΔT each time, the maximum value of the difference between the value of the second signal portion of the determination signal and the value of the non-driving signal is calculated, and the position of each of the determination signal and the non-driving signal on the time axis to be superposed may be set such that this maximum value becomes the smallest.

In the above, the differential signal is generated by superposing the determination signal and the non-driving signal such that the difference between the value of the second signal portion R2 of the determination signal and the value of the non-driving signal becomes the smallest. However, this disclosure is not limited to this. For example, the differential signal may be generated by superposing the determination signal and the non-driving signal such that the difference between the value of the determination signal and the value of the non-driving signal becomes the smallest for the entire determination signal including the portion corresponding to the first signal portion R1 and the portion corresponding to the second signal portion R2.

In the above, the differential signal is generated by superposing the determination signal and the non-driving signal such that the difference between the value of the determination signal and the value of the non-driving signal becomes the smallest. However, this disclosure is not limited to this. For example, the differential signal may be generated by superposing the determination signal and the non-driving signal such that the position on the time axis of each of the value of the determination signal and the non-driving signal is a position on the time axis slightly shifted from the position on the time axis where the difference between the value of the determination signal and the value of the non-driving signal is the smallest.

In the embodiment, whether the target nozzle is an abnormal nozzle is determined based on whether the difference [M−m] between the maximum value M and the minimum value m of the differential signal is larger than or equal to the threshold value Jt, but this disclosure is not limited to this.

Figure 15A:
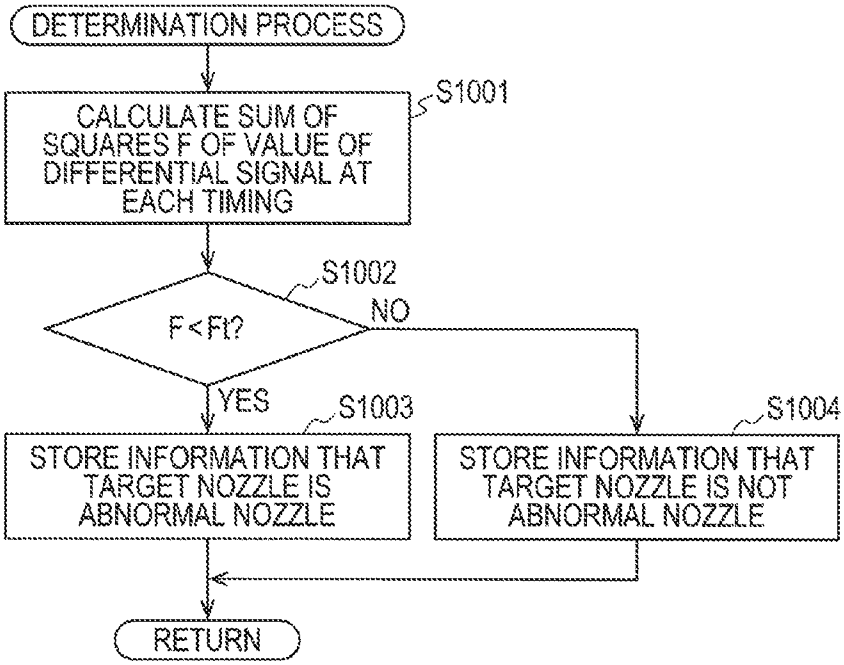
FIG. 15A is a flowchart showing a flow of a determination process.

In a modification 6, in the determination process, the controller 80 executes the processing in accordance with the flow in FIG. 15A. By explaining in more detail, in the determination process, the controller 80 first calculates a sum of squares F of the value at each timing of the differential signal (S1001). If the sum of squares F is smaller than a threshold value Ft (S1002: YES), the controller 80 stores information indicating that the target nozzle is an abnormal nozzle in the flash memory 84 (S1003). If the sum of squares F is larger than or equal to the threshold value Ft (S1002: NO), the controller 80 stores information indicating that the target nozzle is not an abnormal nozzle in the flash memory 84 (S1004).

If the nozzle 10 is an abnormal nozzle, the determination signal and the non-driving signal are substantially the same signals and thus, the differential signal becomes a signal with a value of substantially 0. Thus, whether it is an abnormal nozzle is determined based on whether the sum of squares F of the differential signal is smaller than the threshold value Ft.

Figure 15B:
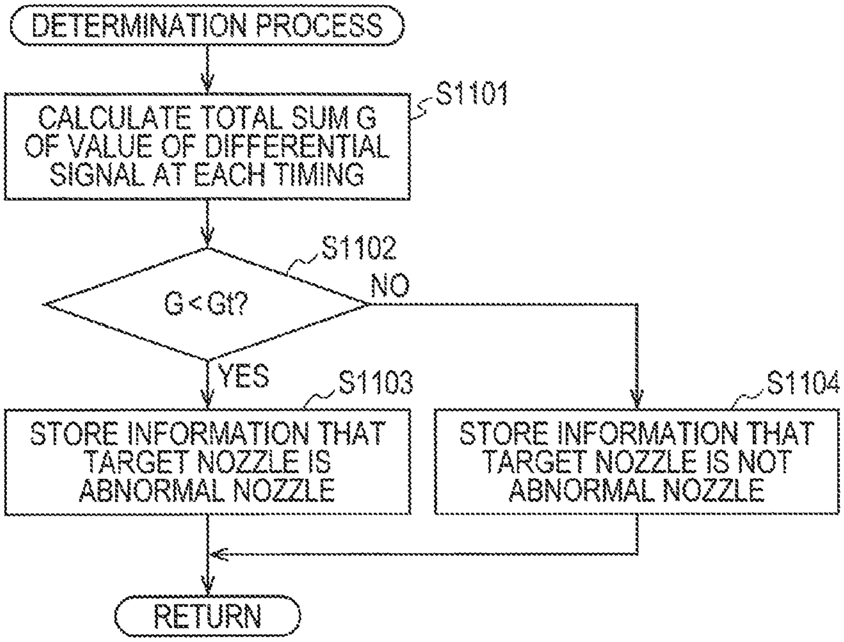
FIG. 15B is a flowchart showing a flow of a determination process.

In a modification 7, in the determination process, the controller 80 executes processing in accordance with the flow in FIG. 15B. By explaining in more detail, in the determination process, the controller 80 first calculates a total sum G of the value (more specifically, the absolute value) of the differential signal at each timing (S1101). If the total sum G is smaller than a threshold value Gt (S1102: YES), the controller 80 stores information indicating that the target nozzle is an abnormal nozzle in the flash memory 84 (S1103). If the total sum G is larger than or equal to the threshold value Gt, the controller 80 stores information indicating that the target nozzle is not an abnormal nozzle in the flash memory 84 (S1104).

If the nozzle 10 is an abnormal nozzle, the determination signal and the non-driving signal are the substantially same signals and thus, the differential signal becomes a signal with a value of substantially 0. Thus, whether it is an abnormal nozzle is determined based on whether the total sum G of the differential signal is smaller than the threshold value Gt.

Whether the nozzle 10 is an abnormal nozzle may be determined based on the differential signal by a method other than the embodiment, the modifications 6 and 7.

In the embodiment, the controller 80 generates the non-driving signal each time determination is made for the particular number of nozzles 10 on whether it is an abnormal nozzle. But this disclosure is not limited to this. For example, the controller 80 may generate the differential signal for all the nozzles 10 to determine whether it is an abnormal nozzle, based on the non-driving signal which is set (generated) initially.

In the above example, the non-driving signal is acquired immediately before the inspection driving is performed, but this disclosure is not limited to this. For example, after performing the inspection driving, the controller 80 may acquire the non-driving signal after an elapse of time required for the voltage change of the detection electrode 76 caused by the inspection driving is sufficiently damped. Alternatively, for example, if a noise does not significantly change due to an elapse of time, the non-driving signal may be acquired in advance, and information of the non-driving signal may be stored in the flash memory 84.

In the above example, the non-driving signal is a signal with a length longer than or equal to the cycle T of power supplied from the AC power source, but this disclosure is not limited to this. The non-driving signal may be a signal slightly shorter than the cycle T of the power supplied from the AC power source.

In the above example, when an abnormal nozzle exists, suction purge is performed uniformly, but this disclosure is not limited to this. For example, as the number of abnormal nozzles increases, the amount of ink discharged in the suction purge may be increased.

In the above example, a suction purge is performed in the purging process, but this disclosure is not limited to this. For example, a pressure pump may be provided in the middle of the tube 15 that connects the sub tank 3 and the ink cartridge 14. Alternatively, the printer may be provided with a pressure pump connected to an ink cartridge. In a state where the plurality of nozzles 10 are covered with the cap 71, the pressure pump may be driven to pressurize ink in the inkjet head 4 and discharge the ink in the inkjet head 4 from the nozzles 10, which is so-called a pressure purge.

Further, in the purge process, both suction by the suction pump 72 and pressurization by the pressure pump may be performed. Further, instead of purging, flushing of causing the inkjet head 4 to discharge ink from at least an abnormal nozzle may be performed. Further, both purging and flushing may be performed.

This disclosure is not limited to that, when an abnormal nozzle exists, the controller 80 automatically performs suction purge and so on. For example, when an abnormal nozzle exists, the user may be notified to select whether to perform suction purge, and when suction purge is selected, suction purge may be performed.

In the above embodiments, all the nozzles 10 of the inkjet head 4 are driven for inspection, but this disclosure is not limited to this. For example, the inspection driving may be performed only on some nozzles 10 of the inkjet head 4 such as every other nozzle 10 in each nozzle array 9, and it may be estimated for the other nozzles 10 whether it is an abnormal nozzle based on the determination result for those some nozzles 10.

In the above-described embodiments, the signal processing circuit 78 outputs a signal indicating whether the nozzle 10 is an abnormal nozzle depending on the change of the voltage of the detection electrode 76 when ink is ejected from the nozzle 10 toward the detection electrode 76. However, the method is not limited to this.

For example, a detection electrode extending in the vertical direction may be arranged, and a determination circuit may output a signal indicating whether the nozzle is an abnormal nozzle depending on the potential of the detection electrode when ink is ejected from the nozzle 10 so as to pass through the region facing the detection electrode. Alternatively, an optical sensor ("signal output device") for detecting the ink ejected from the nozzle 10 may be provided, and the optical sensor may output a signal indicating whether the nozzle is an abnormal nozzle.

Alternatively, for example, as described in Japanese Patent No. 4929699, a voltage detection circuit ("signal output device") for detecting a change in voltage when ink is ejected from a nozzle may be connected to a plate of the inkjet head in which nozzles are formed, and the voltage detection circuit may output, to the controller 80, a signal indicating whether the nozzle is an abnormal nozzle.

Alternatively, for example, as described in Japanese Patent No. 6231759, the control board of the inkjet head may be provided with a temperature detection element ("signal output device"). After applying a first applied voltage to drive the heater for ink ejection, a second applied voltage may be applied to drive the heater so that ink is not ejected, and thereafter a signal indicating whether the nozzle 10 is an abnormal nozzle may be output based on the change in temperature detected by the temperature detection element until a particular time elapses.

In the above example, the signal output device outputs a signal indicating whether ink is ejected from the nozzle 10, but this disclosure is not limited to this. The signal output device may output a signal indicating whether the nozzle is an abnormal nozzle having an abnormality other than that ink is not ejected. The abnormality other than that ink is not ejected is, for example, an abnormality in the ink ejection direction in which ink is ejected.

In the above example, this disclosure is applied to a printer provided with a so-called serial head, which ejects ink from a plurality of nozzles while moving in the scanning direction together with the carriage, but this disclosure is not limited to this. For example, this disclosure may be applied to a printer provided with a so-called line head extending over the entire length of the recording sheet P in the scanning direction.

In the above example, this disclosure is applied to a printer that ejects ink from nozzles and records on a recording sheet P, but this disclosure is not limited to this. This disclosure may also be applied to a printer that records an image on a recording medium other than a recording sheet, such as a T-shirt, a sheet for outdoor advertising, a case of a mobile terminal such as a smartphone, a corrugated cardboard, and a resin member. This disclosure may also be applied to a liquid ejection apparatus that ejects liquid other than ink, for example, a liquefied resin or metal.

What is claimed is:

1. A liquid ejection apparatus comprising:

a liquid ejection head having a nozzle configured to eject liquid;

a signal processing circuit electrically connected to an electrode, the signal processing circuit is configured to output, as a signal, voltage of the electrode that fluctuates in response to liquid being ejected from the nozzle; and a controller configured to:

acquire a first signal outputted from the signal processing circuit, a time period of the first signal being a combination of a first time period in which liquid is ejected from the head toward the electrode and a second time period in which liquid is not ejected from the head toward the electrode, wherein the first time period and the second time period are acquired so as to be continuous in time;

acquire a second signal outputted from the signal processing circuit, a time period of the second signal being a third time period in which liquid is not ejected from the head toward the electrode, wherein the third time period is longer than the combination of the first time period and the second time period;

determine a fourth time period in the second signal having values of voltage closest to values of the voltage of the first signal during the second time period, the fourth time period being a subset of the third time period;

superimpose the first signal and the second signal to have the values of voltage in the second time period and the fourth time period coincide on a time axis, and generate a third signal that is a difference between the first signal and the second signal as superimposed; and determine whether the nozzle is in an abnormal state based on the third signal.

2. The liquid ejection apparatus according to claim 1, wherein the fourth time period is determined such that a total sum of absolute values of differences between the values of voltage of the second time period and corresponding values of voltage of the second signal, respectively, becomes smallest.

3. The liquid ejection apparatus according to claim 1, wherein the fourth time period is determined such that a sum of squares of differences between the values of voltage of the second time period and corresponding values of voltage of the second signal, respectively, becomes smallest.

4. The liquid ejection apparatus according to claim 1, wherein the controller is configured to:

in response to determining that a difference between a maximum value and a minimum value of the third signal is larger than or equal to a threshold value, determine that the nozzle is not in the abnormal state; and in response to determining that the difference between the maximum value and the minimum value of the third signal is smaller than the threshold value, determine that the nozzle is in the abnormal state.

5. The liquid ejection apparatus according to claim 1, wherein the controller is configured to:

in response to determining that a sum of squares of values of the third signal within a superposed time period is smaller than a threshold value, determine that the nozzle is in the abnormal state; and in response to determining that the sum of squares of the values of the third signal within the superposed time period is larger than or equal to the threshold value, determine that the nozzle is not in the abnormal state.

6. The liquid ejection apparatus according to claim 1, wherein the controller is configured to:

in response to determining that a total sum of values of the third signal within a superposed time period is smaller than a threshold value, determine that the nozzle is in the abnormal state; and in response to determining that the total sum of the values of the third signal within the superposed time period is larger than or equal to the threshold value, determine that the nozzle is not in the abnormal state.

7. The liquid ejection apparatus according to claim 1, further comprising a power source, wherein the power source is an AC power source; and wherein the second signal is a signal which is longer than or equal to a cycle of electric power supplied from the AC power source.

8. The liquid ejection apparatus according to claim 1, wherein the signal processing circuit outputs and the controller acquires the second signal immediately before inspection driving is performed by the liquid ejection head.

9. The liquid ejection apparatus according to claim 8, wherein the liquid ejection head has a plurality of nozzles; and wherein the controller is configured to:

control the liquid ejection head to perform the inspection driving sequentially for the plurality of nozzles;

acquire the first signal for the plurality of nozzles, respectively;

acquire the second signal immediately before the inspection driving is first performed by the liquid ejection head; and each time the first signal is acquired for a particular number of nozzles, acquire the second signal to update the second signal used for generating the third signal, respectively.

10. The liquid ejection apparatus according to claim 1, wherein the controller is configured to:

continuously acquire a plurality of second signals;

in response to determining that a variation of the plurality of second signals is within a particular range, generate the third signal by using one of the acquired plurality of second signals; and in response to determining that the variation of the plurality of second signals is not within the particular range, reacquire a plurality of second signals.

11. The liquid ejection apparatus according to claim 10, wherein the controller is configured to:

calculate, for all combinations of two of the plurality of second signals, a sum of squares of differences between values of voltage of the two of the plurality of second signals, the values of voltage corresponding to a time period for non-driving;

in response to determining that the sum of squares is smaller than a particular value for all the combinations of two of the plurality of second signals, determine that the variation of the plurality of second signals is within the particular range; and in response to determining that the sum of squares is larger than or equal to the particular value for any one of all the combinations of two of the plurality of second signals, determine that the variation of the plurality of second signals is not within the particular range.

12. The liquid ejection apparatus according to claim 10, wherein the controller is configured to:

calculate, for all combinations of two of the plurality of second signals, a total sum of differences between values of voltage of the two of the plurality of non-driving second signals, the values of voltage corresponding to a time period for non-driving;

in response to determining that the total sum is smaller than a particular value for all the combinations of two of the plurality of second signals, determine that the variation of the plurality of second signals is within the particular range; and in response to determining that the total sum is larger than or equal to the particular value for any one of all the combinations of two of the plurality of second signals, determine that the variation of the plurality of second signals is not within the particular range.

13. The liquid ejection apparatus according to claim 1, wherein the controller is configured to:

in response to determining that a sum of squares of values of the third signal within a superposed time period is larger than a particular value, reacquire the second signal and generate the third signal by using the reacquired non-driving second signal.

14. The liquid ejection apparatus according to claim 1, wherein the controller is configured to:

in response to determining that a total sum of values of the third signal within a superposed time period is larger than a particular value, reacquire the second signal and generate the third signal by using the reacquired second signal.

15. The liquid ejection apparatus according to claim 1, wherein the controller is configured to:

in response to determining that a particular or larger number of exceeding points exist in a signal portion corresponding to the second time period in the third signal, reacquire the second signal and generate the third signal by using the reacquired second signal, the exceeding points being points on the time axis at which a value of the third signal exceeds a particular value.

16. The liquid ejection apparatus according to claim 1, further comprising a power source, wherein the power source is an AC power source; and wherein the second signal contains a signal repeated with a cycle of electric power supplied from the AC power source.

17. The liquid ejection apparatus according to claim 1, further comprising a cap, wherein the electrode is within the cap.

18. The liquid ejection apparatus according to claim 1, wherein the determine the fourth time period comprises shifting, in time, the first signal and/or the second signal to superpose the first signal and the second signal in order to have a sum of differences between values of voltage of the first signal in the second time period and corresponding values of voltage of the second signal, respectively, become the smallest, the shifting causing the values of voltage of the first signal in the second time period and the corresponding values of voltage of the second signal, respectively, to be aligned in time.

19. The liquid ejection apparatus according to claim 18, wherein the shifting is iteratively performed, and after each shift, the sum of differences is determined.

* * * * *